No. 731,607. PATENTED JUNE 23, 1903.
H. E. OVING.
METER FOR AIR AND GAS MIXTURES.
APPLICATION FILED MAR. 12, 1903.
NO MODEL. 2 SHEETS—SHEET 1.
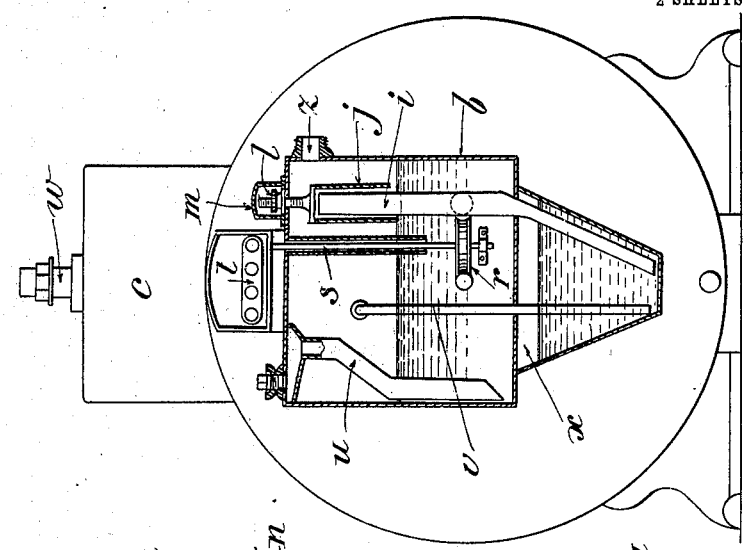
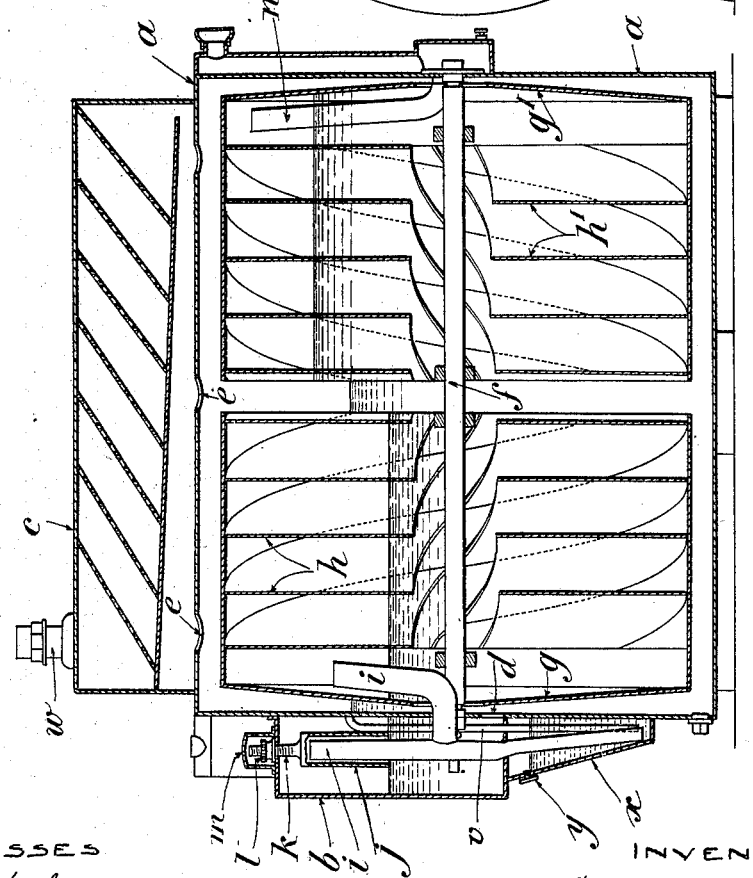
WITNESSES
INVENTOR
Hermannus Ellens Oving
BY
ATTORNEYS
THE NORRIS PETERS CO., PHOTO-LITHO., WASHINGTON, D. C.

No. 731,607. PATENTED JUNE 23, 1903.
H. E. OVING.
METER FOR AIR AND GAS MIXTURES.
APPLICATION FILED MAR. 12, 1903.
NO MODEL. 2 SHEETS—SHEET 2.
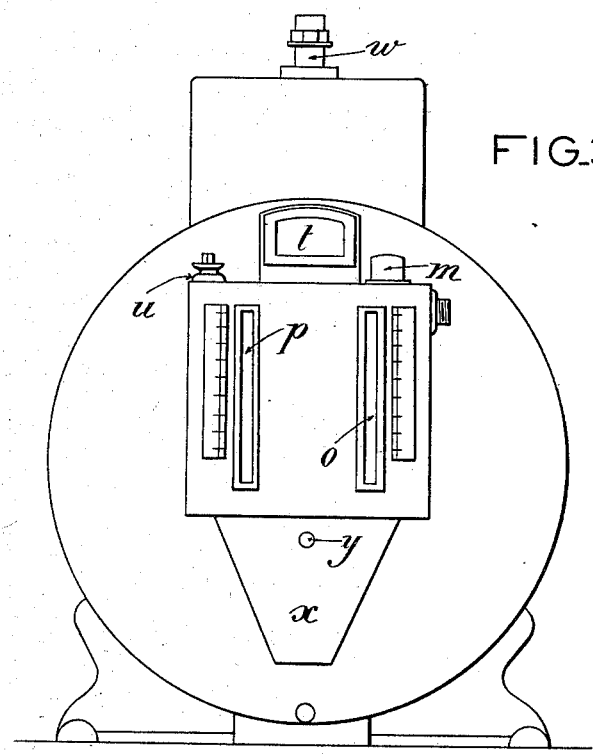
FIG.3.
FIG.6.
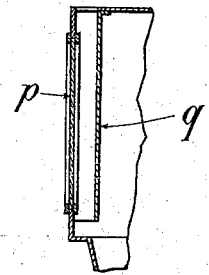
FIG.4.
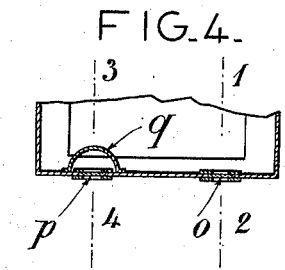
FIG.5.
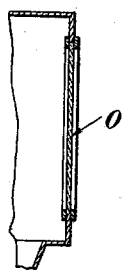
WITNESSES
H. M. Kuehne
John A. Percival.
INVENTOR
Hermannus Ellens Oving
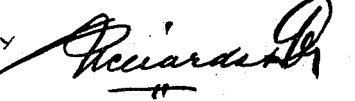
BY
ATTORNEYS No. 731,607. Patented June 23, 1903.

UNITED STATES PATENT OFFICE.

HERMANUS ELLENS OVING, OF ROTTERDAM, NETHERLANDS.

METER FOR AIR AND GAS MIXTURES.

SPECIFICATION forming part of Letters Patent No. 731,607, dated June 23, 1903.

Application filed March 12, 1903. Serial No. 147,467. (No model.)

*To all whom it may concern:*

Be it known that I, HERMANUS ELLENS OVING, a subject of the Queen of the Netherlands, and a resident of 31 and 33 Geldersche kade, Rotterdam, Netherlands, have invented a certain new and useful Improved Meter for Air and Gas Mixtures, of which the following is a specification.

This invention relates to an improved meter for gas and air mixtures which registers the volume of the mixture discharged, which allows of controlling at any moment the proportion of air and gas contained in the mixture discharged by the apparatus, and which allows of determining in advance the highest proportion of air entering in the mixture beyond which the apparatus ceases to work. This limit can, besides, be changed as desired at any moment of the work.

In the annexed drawings, Figure 1 is a vertical section through the chamber for the gas-inlet. Fig. 2 is a longitudinal vertical section through the axis of the apparatus. Fig. 3 is a front outside view. Fig. 4 is a horizontal section through the chamber for the gas-inlet, showing the two water-gages. Fig. 5 is a section through the line 1 2 of Fig. 4, and Fig. 6 is a section through the line 3 4 of Fig. 4.

The apparatus comprises, essentially, a cylindrical receiver $a$, having a horizontal axis partially filled with water or other liquid and provided on one side with a chamber $b$, projecting outward, in which the gas which has to be mixed to the air enters by the tube $z$. The receiver $a$ is terminated at the upper part in a partitioned or divided dome $c$ for the exit of the gaseous mixture.

The inner space of the receiver $a$ communicates with the interior of the chamber $b$ through the hole $d$ made in the wall of the cylinder and with the interior of the dome $c$ by the openings $e$ made in the cylindrical upper wall.

The cylinder $a$ is traversed for its length by a rotary shaft $f$, on which two drums $g$ $g'$, provided with spiral or Archimedean screws $h$ $h'$, are fixed.

The inner space of the drum $g$ communicates with the chamber $b$ through a U-shaped tube $i$ and by means of a tubular cap $j$, which covers the branch of the tube $i$, leading to the chamber $b$. This tubular cap $j$ is extended upward by a screw-threaded rod $k$, which allows of lifting or lowering said cap by means of a nut $l$. A protecting leaded casing $m$ incloses the nut $l$ and prevents anybody from varying the regulation by changing the height of the cap $j$.

The inner space of the drum $g'$ communicates directly with the outside air through a U-shaped tube $n$.

On the wall of the chamber $b$ are secured two water-gages $o$ and $p$, the one, $o$, adapted to give the water-level in the chamber $b$ or in the drum $g$ and the other, $p$, adapted to give the water-level in the drum $g'$. For this purpose the water-gage $o$ is directly in contact with the water and the gas of the chamber $b$, while the water-gage $p$ is in contact with the water of the chamber $b$, but not with the gas. A semicylindrical casing $q$ surrounds this water-gage and leads at the bottom to the water of the chamber and at the top to the outside air, so that the water mounts up in said casing—that is to say, in the water-gage—to the same height as in the drum $g'$, since it is air at the pressure of the atmosphere that is discharged by said drum. Scales are arranged at the sides of these water-gages and allow of rendering account at once and at any moment of the proportion of gas and air contained in the mixture discharged by the meter, as will be hereinafter explained. The shaft $f$ of the drums terminates at the chamber $b$ in an endless screw which engages a helical wheel $r$, keyed on a vertical shaft $s$, which operates a counter of revolutions $t$. Finally the necessary quantity of water is poured into the apparatus by a tubulure $u$, which is afterward closed by a plug, and the water-overflow passes by way of a pipe $v$ to a lower chamber $x$, provided with a discharge-plug $y$. During the filling of the apparatus the plug $y$ is removed, and as soon as the water flows out by the corresponding opening the pouring is stopped.

Into the chamber $x$ leads the extension of one of the branches of the U-shaped tube $i$, with the view of conducting to said chamber the waste water deposited by the gas in the U-shaped tube.

The apparatus works as follows: Before it is started the water-level is the same in the cylindrical receiver $a$, in the chamber $b$, and in the drums $g$ $g'$. If the pipe for the gas-inlet of the apparatus is opened, the gas by its pressure causes the water-level to sink in the chamber $b$ to the bottom of the tubular cap $j$. The gas is then free to escape into the U-shaped tube $i$ and from thence to the drum $g$, which causes both drums to rotate. The drum $g'$ in turning sucks air through the U-shaped tube $n$. The air and gas discharged by the drums enter the receiver $a$, pass from there to the mixing-dome $c$, and then escape by the pipe $w$. The volume of the mixture discharged is measured by the counter $t$. As to the proportion of the gas and air volumes of the mixture, it depends on three elements—first, of the diameter of the drums; second, of the pitch of the spiral screws of said drums, and, third, of the height of the water-level in said drums. Well, the diameters of the drums and the pitch of the spiral screws are invariable and known. It is only the heights of the water-levels that can vary. Therefore to have the composition of the mixture at any moment it is only necessary to know at that moment the exact height of the water-levels in the drums. This is obtained by the simple examination of the scales arranged at the sides of the water-gages $o$ and $p$, one of which gives the water-level in the drum $g$ and the other the water-level in the drum $g'$. It may be understood, on the other hand, that if the pressure of the gas admitted diminishes, the free volume in the gas-drum—that is to say, the volume of the gas discharged—diminishes, while the free volume in the air-drum augments on account of the diminution of pressure in the receiver $a$. Therefore mixtures very rich in air, which in certain cases would be explosive, could be formed if the apparatus was not provided with a special device; but on account of the tubular cap $j$, which controls the entrance of gas in the U-shaped tube $i$, and consequently in the drum $g$, the apparatus cannot work and the mixture cannot be formed unless the gas admitted has a pressure high enough to cause the water-level in the chamber $b$ to sink below the bottom edge of the tubular cap $j$. It is thus possible to regulate in advance at any desired moment, by raising or lowering the cap $j$, the lowest pressure below which the apparatus will not be free to work any more and the mixture to be formed any more, which avoids all danger of explosion.

Having now described my invention, what I claim as new, and and desire to secure by Letters Patent, is—

A meter for air and gas mixtures comprising a horizontal cylinder $a$ partially filled with water, in combination with a partitioned dome $c$ through which passes the mixture, a rotary shaft $f$ journaled in the end walls of the cylinder, two drums $g$ and $g'$ secured to the shaft $f$, spiral screws $h$ and $h'$ arranged respectively in the drums and rotating therewith, a chamber $b$ fixed at one end of the cylinder $a$ and communicating at the top with the gas-inlet and at the bottom with the interior of the cylinder, a U-shaped tube $i$ secured to one of the end walls of the cylinder $a$ and having one branch leading to the top part of the chamber $b$ and the other branch to the drum $g$, a tubular cap $j$ which covers the branch of the tube $i$ leading to the chamber $b$, a screw-threaded rod $k$ fixed to the cap $j$, a nut $l$ mounted on said rod outside the chamber $b$, a leaded casing $m$ covering the nut $l$ and its rod $k$, a U-shaped tube $n$ secured to the other end of the cylinder $a$ and having one branch leading to the outside air and the other branch to the drum $g'$, a water-gage $o$ placed in the chamber $b$ and in contact with the water and gas contained in said chamber, a water-gage $p$ placed in the chamber $b$, a casing $q$ separating said water-gage $p$ from the space of the chamber $b$ filled with gas and leading at the bottom into the liquid of the chamber and at the top into the outside air, an overflow-tube $v$, an overflow-chamber $x$, an endless screw formed at one end of the shaft of the cylinder, a helical wheel $r$ engaging said endless screw, a vertical shaft $s$ driven by said wheel and a counter $t$ controlled by the shaft $s$, substantially as and for the purpose set forth.

In witness whereof I have hereunto set my hand in presence of two witnesses.

HERMANUS ELLENS OVING.

Witnesses:
 JACOB GILLES LOUIS RIJNBERG,
 JOHANNES D. FÜHRING.